(12) United States Patent
Andrew et al.

(10) Patent No.: US 11,645,792 B2
(45) Date of Patent: May 9, 2023

(54) EDGE PHASE EFFECTS REMOVAL USING WAVELET CORRECTION AND PARTICLE CLASSIFICATION USING COMBINED ABSORPTION AND PHASE CONTRAST

(71) Applicant: Carl Zeiss X-ray Microscopy, Inc., Dublin, CA (US)

(72) Inventors: Matthew Andrew, Dublin, CA (US); Lars Omlor, Dublin, CA (US); Hrishikesh Bale, Dublin, CA (US); Christoph Graf vom Hagen, Dublin, CA (US)

(73) Assignee: Carl Zeiss X-ray Microscopy, Inc., Dublin, CA (US)

( * ) Notice: Subject to any disclaimer, the term of this patent is extended or adjusted under 35 U.S.C. 154(b) by 0 days.

(21) Appl. No.: 17/760,892

(22) PCT Filed: Dec. 18, 2020

(86) PCT No.: PCT/US2020/066148
§ 371 (c)(1),
(2) Date: Mar. 16, 2022

(87) PCT Pub. No.: WO2021/127522
PCT Pub. Date: Jun. 24, 2021

(65) Prior Publication Data
US 2022/0366620 A1 Nov. 17, 2022

Related U.S. Application Data

(60) Provisional application No. 62/951,857, filed on Dec. 20, 2019.

(51) Int. Cl.
G06T 7/13 (2017.01)
G06T 7/155 (2017.01)
(Continued)

(52) U.S. Cl.
CPC ............ *G06T 11/008* (2013.01); *G01N 23/20* (2013.01); *G01N 23/223* (2013.01);
(Continued)

(58) Field of Classification Search
CPC ......... G06T 11/008; G06T 7/13; G06T 7/155; G06T 2207/10121; G06T 2207/20021;
(Continued)

(56) References Cited

U.S. PATENT DOCUMENTS

| 7,800,072 B2 | 9/2010 | Yun et al. | |
|---|---|---|---|
| 2014/0072095 A1* | 3/2014 | Feser | G01N 23/223 378/4 |

FOREIGN PATENT DOCUMENTS

| CN | 107895360 A | 4/2018 |
|---|---|---|
| CN | 108680589 A | 10/2018 |

(Continued)

OTHER PUBLICATIONS

Thompson DA, Nesterets YI, Pavlov KM, Gureyev TE. Fast three-dimensional phase retrieval in propagation-based X-ray tomography. Journal of synchrotron radiation. May 1, 2019;26(3):825-38. (Year: 2019).*

(Continued)

*Primary Examiner* — Vu Le
*Assistant Examiner* — Tracy Mangialaschi
(74) *Attorney, Agent, or Firm* — HoustonHogle LLP

(57) ABSTRACT

An x-ray microscopy method that obtains a classification of different particles by distinguishing between different material phases through a combination of image processing involving morphological edge enhancement and possibly resolved absorption contrast differences between the phases along with optional wavelet filtering.

9 Claims, 16 Drawing Sheets

(51) Int. Cl.
| | |
|---|---|
| *G06V 20/70* | (2022.01) |
| *G06V 10/764* | (2022.01) |
| *G01N 23/20* | (2018.01) |
| *G01N 23/2206* | (2018.01) |
| *G01N 23/223* | (2006.01) |
| *G06T 11/00* | (2006.01) |

(52) U.S. Cl.
CPC .......... *G01N 23/2206* (2013.01); *G06T 7/13* (2017.01); *G06T 7/155* (2017.01); *G06V 10/764* (2022.01); *G06V 20/70* (2022.01); *G01N 2223/045* (2013.01); *G01N 2223/056* (2013.01); *G01N 2223/076* (2013.01); *G01N 2223/419* (2013.01); *G06T 2207/10121* (2013.01); *G06T 2207/20021* (2013.01); *G06T 2207/20036* (2013.01); *G06T 2207/20212* (2013.01)

(58) Field of Classification Search
CPC .......... G06T 2207/20036; G06T 2207/20212; G06V 20/70; G06V 10/764; G01N 23/20; G01N 23/2206; G01N 23/223; G01N 2223/045; G01N 2223/056; G01N 2223/419; G01N 2223/076
See application file for complete search history.

(56) References Cited

FOREIGN PATENT DOCUMENTS

| | | |
|---|---|---|
| CN | 110310347 A | 10/2019 |
| WO | WO 2020097111 | 5/2020 |

OTHER PUBLICATIONS

Zhong, Zhichao, et al. "A bimodal tomographic reconstruction technique combining EDS-STEM and HAADF-STEM." Ultramicroscopy 174 (2017): 35-45. (Year: 2017).*

Münch, Beat, et al. "Stripe and ring artifact removal with combined wavelet—Fourier filtering." Optics express 17.10 (2009): 8567-8591. (Year: 2009).*

Pande-Chhetri, Roshan, and Amr Abd-Elrahman. "De-striping hyperspectral imagery using wavelet transform and adaptive frequency domain filtering." ISPRS journal of photogrammetry and remote sensing 66.5 (2011): 620-636. (Year: 2011).*

Zhang, Jenny Z., et al. "Getting to the core of platinum drug bio-distributions: the penetration of anti-cancer platinum complexes into spheroid tumour models." Metallomics 4.11 (2012): 1209-1217. (Year: 2012).*

Anonymous, "Generic Controlled Release Capsule Microstructure Equivalence," Digitial Microstructure, 1-6 (2020).

Anonymous, "Q3 Equivalence," Nanopharm, 1-7 (2020).

Buades, A., et al., "Non-Local Means Denoising," Image Processing on Line, 1: 208-212 (2011).

De Witte, Y., et al.,"The Bronnikov Aided Correction for X-ray Computed Tomography," Optical Society of America, 1-8 (2009).

Gajjar, P., et al., "Multiscale Tomography: Probing the Nano-, Micro-, and Meso-Scale Resolution of Inhalation Powder Structure," RDD Europe 2019, 155-168 (2019).

International Preliminary Report on Patentability of the International Preliminary Examining Authority dated Oct. 26, 2021, from International Application No. PCT/US2020/066148, filed on Dec. 18, 2020. 47 pages.

International Search Report and Written Opinion of the International Searching Authority, dated Mar. 25, 2021, from International Application No. PCT/US2020/066148, filed on Dec. 18, 2020. 13 pages.

Luke, M., "Equivalence of Locally-Acting Drug Products," GDUFA Research Public Workshop, 1-26 (2017).

Munch, B., et al., "Stripe and Ring Artifact Removal with Combined Wavelet—Fourier Filtering," Optical Society of America, 17(10): 8567-8591 (2009).

Thompson, D.A., et al., "Fast Three-Dimensional Phase Retrieval in Propagation-Based X-ray Tomography," Journal of Synchrotron Radiation, 26: 825-838 (2019).

Wernernsson, E.L.G., et al., "Understanding Phase Contrast Artefacts in Micro Computed Absorption Tomography," SSBA Symposium, Proceedings, 1-6 (2014).

Boone, M., "Practical Use of the Modified Bronnikov Algorithm in micro-CT," Nuclear Instruments and Methods in Physics Research Section B, 1-6 (2009).

* cited by examiner

FIG. 6A

EDGE PHASE EFFECTS REMOVAL USING WAVELET CORRECTION AND PARTICLE CLASSIFICATION USING COMBINED ABSORPTION AND PHASE CONTRAST

RELATED APPLICATIONS

This application is a § 371 National Phase Application of International Application No. PCT/US2020/066148, filed on Dec. 18, 2020, now International Publication No. WO 2021/127522 A1, published on Jun. 24, 2021, which International Application claims the benefit under 35 USC 119(e) of U.S. Provisional Application No. 62/951,857, filed on Dec. 20, 2019, both of which are incorporated herein by reference in their entirety.

BACKGROUND OF THE INVENTION

Multiphase materials often comprise particles with two or more material phases where the different material phases have different chemistries with possibly insignificant density differences and/or different structures, e.g., amorphous or crystalline states or different crystalline structures. Process control and quality inspection of these materials requires investigation of large volumes of these particles with the requirement of identification of the different material phases, specifically identifying relative volume fractions of different material phases, among other characterization metrics.

One example of such a multiphase material are inhalers for drug delivery. Powder formulations for use in dry powder inhalers are commonly composed of a blend of coarse carrier particles, e.g., lactose, and active pharmaceutical ingredient(s), with fine lactose particles sometimes added to improve performance. See Multiscale Tomography: Probing The Nano-, Micro-, And Meso-Scale Resolution Of Inhalation Powder Structure, by Gajjar, et al., RDD Europe 2019 (Vol. 1, pp. 155-168).

The distribution of the different particles, particle size and distribution of the different material phases, and particle shape are important metrics for assessing how the drug will be absorbed by the patient and thus critical for quality control. Microstructure equivalency (Q3) concerns characterizing and assessing differences between the same components (Q1) in the same concentration (Q2) under a non-equilibrium state. Its related to the arrangement of matter and/or its state of aggregation. This is important for establishing that the sample will function or perform as expected for its intended use. This often arises in the context of pharmaceutical manufacturing in the context of assessing bioequivalence (BE). This is defined as the absence of a significant difference in the rate and extent to which the active ingredient or active moiety in a pharmaceutical equivalent becomes available at the site of drug action when administered at the same molar dose under similar conditions in an appropriately designed study. BE must be established in order to infer therapeutic equivalence (TE) between the manufactured pharmaceutical and the corresponding reference pharmaceutical. Important dimensions for inhalers for assessing equivalency include polymorphism, crystal habit, and drug particle size distribution of the drug and the carrier, and particle surface area.

Traditionally control and inspection were performed using two dimensional (2D) surface imaging techniques using scanning electron or light microscopy. These approaches have imaging speed limitations for processing a batch of samples. Moreover, the surface scanning approach does not give a good size estimate of the 3D particles, which are usually irregularly shaped. In addition, these analysis modalities can be incompatible with aerosol backed pharmaceuticals possibly under vacuum environments. Moreover, the sample preparation is generally extensive for electron microscopy. For crystallographic/facet information, grain orientation through Electron Backscatter Diffraction (EBSD) can only be done on a single particle or compacted bulk where sample preparation is extensive.

SUMMARY OF THE INVENTION

The present approach employs X-ray analysis and possibly computed tomography. 3D X-ray tomography can provide very fast volumetric classification of particles by scanning large volumes of a given sample in a single scan. However, the minimal density differences between the material phases pose immense challenges in discerning different material phases since the x-ray absorption contrast between the two material phases is extremely low. When even low density particles are imaged in X-ray tomography at sufficiently high resolution, even on scanners using laboratory-based polychromatic x-ray tubes, the reconstructed image slices demonstrate distinct phase signals or fringes around the edges of the particles that obscure whatever minimal absorption contrast differences exist in the resultant tomography slices.

The present approach relies on x-ray microscopy but obtains a classification of different material phases through a combination of image processing involving morphological edge enhancement and possibly resolved absorption contrast differences between the material phases.

In examples, it uses a correlative multimodal workflow where the modalities could be phase signals and/or diffraction and/or X-ray fluorescence contrast, and obtains labels for classification of similar looking particles in three dimensions.

In mixed formulations consisting of mixed material phase microscopic particles, the classification of individual material phases and quantification of volume fractions of each material phase within the bulk samples has been challenging. In contrast, the present approach takes advantage of the phase fringe information for improved feature detection and absorption information for resolving material phases. Both these unique information sets can be extracted from a single tomography scan, the latter being extracted through algorithmic post-processing. The two datasets are combined to generate the final contrast enhanced datasets which can be directly used for labeling of particles and quantification of volume fractions of different material phases.

Moreover, different samples could be used. They could even be frozen.

On a related topic, in the past, phase contrast removal via wavelet deconvolution employed idealized representation of a wavelet the process did not describe its practical determination on real samples under realistic conditions. This is similar to the drawing of a line profile and estimation of appropriate values via that line profile. They do not describe how to exactly determine optimal wavelet parameters, either using automated methods, or visually by the user (as described here).

Thus, the invention also concerns the determination of parameters for the removal of phase contrast artifacts via a form of wavelet-style deconvolution. This is used for the material separation correlative multi modal workflow. This process includes initially estimating wavelet width via automated measurement on a line profile. Then a multiple scan series is used, scanning over both wavelet amplitude and width for optimal parameter choice.

This approach can be performed on a sub-volume, for computational efficiency. The automated strength selection is performed via signal to noise ratio (SNR) maximization. Image denoising can be applied via non-local means. Moreover, automated parameter selection for non-local means filtering via average noise measurements can be used.

In general, empirically, the wavelet width must be determined at +/−0.5 pixel, and the wavelet amplitude must be correct to within a factor of 2, although the impact is not the same for under versus over estimation of amplitude. If wavelet amplitude is under-estimated, phase fringes are not effectively removed. If wavelet amplitude is over-estimated the phase artefacts are removed, but noise is also exacerbated.

For example, application for this technology is for inhalers, drug delivery, especially to lungs, by attached cancer drugs. This technology can be used to determine whether the drug will be well distributed across the dose. Other applications include: analysis of other low Z materials, such as carbon materials in Li-ion batteries, graphite, rock samples, petrified bugs in amber, any sample with low intrinsic contrast, and then remove phase fringe artifacts.

Moreover, the source spectrum could be shaped to enhance the phase fringes. Sample images with different filters could be used, to build different images under different conditions, especially when the effective wavelength of source is an unknown.

In general, according to one aspect, the invention features a method for material analysis, wherein the material comprises particles with two or more phases where the different phases have chemistries with insignificant density differences, and amorphous or crystalline states. The method comprises obtaining a set of x-ray projections containing absorption and phase information for reconstruction of a tomography of a sample, obtaining a reconstructed volume dataset, obtaining morphological edge information from the reconstructed volume dataset, and classifying particles within the sample.

In some examples, before classifying the particles, differential absorption contrast enhancement is performed on the set of projections a second reconstructed volume dataset is obtained. The volume datasets are then combined.

In some examples, combining the volume datasets comprises performing voxel labeling on one of the volume data sets to create a 3D binary mask that is applied to the other volume dataset.

The morphological edge information can be obtained using wavelet based filtering, which is used to remove edge phase effects from the reconstructed volume dataset.

In a possible automated process, the wavelet based filtering includes estimating wavelet width via automated measurement on a subvolume. This could be achieved by performing a series of wavelet deconvolutions at a variety of strengths and selecting a strength that maximizes signal to noise ratio.

In implementations, a report is generated that provides information including volume fraction estimates of the individual phases, aspect ratios of the particles, and/or the particle size distribution within the sample.

In some uses, the sample is a pharmaceutical, such as an inhaler.

Also, in addition, x-ray fluorescence can be used to detect different elements to create elemental maps.

In general, according to another aspect, the invention features an x-ray microscopy system comprising an x-ray imaging system for obtaining the projections and a computer system for applying the described method.

In general, according to another aspect, the invention a method for phase contrast removal. This method comprises obtaining projections of a sample with an x-ray microscopy system having a polychromatic x-ray source and performing a series of wavelet deconvolutions at different strengths, assessing image noise to determine a correction strength value.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 6A and 6B are schematic diagrams showing how absorption and phase fringe enhanced images are used to improve particle analysis;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present approach generally relates to a correlative, multi-modal imaging technique. It can use diffraction computed tomography for particle and/or material phase separation. It can work even when absolute contrast between particles or material phases is similar.

Figure 1:
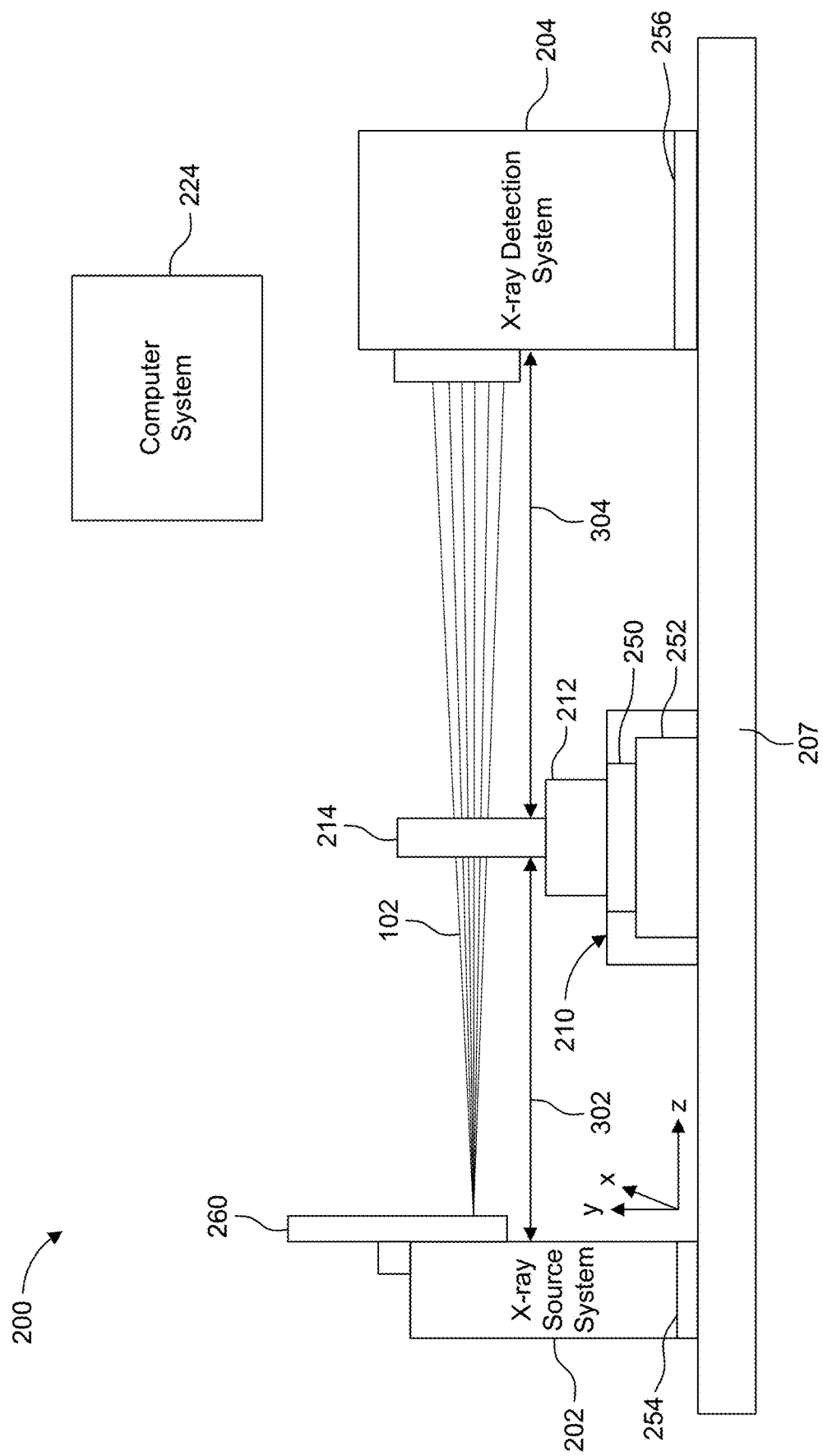
FIG. 1 is a schematic diagram of an x-ray microscopy system for the volumetric classification of particles in a sample by volume scanning.

FIG. 1 is a schematic diagram of an x-ray microscopy system 200 for volume scanning a sample 214 to classify including assess and quantify particles in the sample.

The microscope 200 generally includes an X-ray imaging system that has an X-ray source system 202 that generates a polychromatic or possibly monochromatic X-ray beam 102 and a stage system 210 with sample holder 212 for holding the sample 214 and positioning it to enable scanning of the sample 214 in the stationary beam 102.

An x-ray detection system 100 detects the beam 102 after it has been modulated by the sample 214. Currently, the x-ray detection system 100 is as described in U.S. Pat. No. 7,800,072 or PCT International Appl. No. PCT/US2019/059916.

This system 200 often includes an x-ray detection system 100 as described in U.S. Pat. No. 7,800,072 or PCT International Appl. No. PCT/US2019/059916, International Publ. No. WO 2020/097111.

A base such as a platform or optics table 207 provides a stable foundation for the microscope 200. The stage system 210 has the ability to position and rotate the sample 214 in the beam 102. Thus, the stage system 210 will typically include a precision 3-axis stage 250 that translates and positions the sample along the x, y, and z axes, very precisely but over relatively small ranges of travel. This allows a region of interest of the sample 214 to be located within the beam 102. The 3-stage stage 250 is mounted on a theta stage 252 that rotates the sample 214 in the beam around the y-axis to enable scanning of the sample. The theta stage 252 is in turn mounted on the base 107.

The source system 102 will typically be either a synchrotron x-ray radiation source or alternatively a "laboratory x-ray source" in some embodiments. As used herein, a "laboratory x-ray source" is any suitable source of x-rays that is not a synchrotron x-ray radiation source. Laboratory x-ray source 202 can be an X-ray tube, in which electrons are accelerated in a vacuum by an electric field and shot into a target piece of metal, with x-rays being emitted as the electrons decelerate in the metal. Typically, such sources produce a continuous spectrum of background x-rays combined with sharp peaks in intensity at certain energies that derive from the characteristic lines of the selected target, depending on the type of metal target used. Furthermore, the x-ray beams are divergent and lack spatial and temporal coherence.

In one example, source 202 is a rotating anode type or microfocused source, with a Tungsten target. Targets that include Molybdenum, Gold, Platinum, Silver or Copper also can be employed. Preferably a transmission configuration is used in which the electron beam strikes the thin target from its backside. The x-rays emitted from the other side of the target are used as the beam 102.

The x-ray beam generated by source 202 is preferably conditioned to suppress unwanted energies or wavelengths of radiation. For example, undesired wavelengths present in the beam are eliminated or attenuated, using, for instance, energy filters (designed to select a desired x-ray wavelength range (bandwidth)) held in a filter wheel 260. Conditioning is also often provided by collimators or condensers and/or an x-ray lens such as a zone plate lens.

When the sample 214 is exposed to the X-ray beam 102, the X-ray photons transmitted through the sample form a modulated x-ray beam that is received by the detection system 204. In some other examples, a zone plate objective x-ray lens is used to form an image onto x-ray detection system 204.

Typically, a magnified projection image of the sample 214 is formed on the detection system 204. The magnification is equal to the inverse ratio of the source-to-object distance 302 and the source-to-detector distance 304.

Typically, the x-ray source system 202 and the detection system 204 are mounted on respective z-axis stages. For example, in the illustrated example, the x-ray source system 202 is mounted to the base 207 via a source stage 254, and the detection system 204 is mounted to the base 207 via a detector stage 256.

The operation of the system 200 and the scanning of the sample 214 is controlled by a computer system 224 that often includes an image processor subsystem and a controller subsystem. The computer system is used to readout the optical image detected by the camera 110 of the detection system 204. The computer system 224, with the possible assistance of its image processor, accepts the set of images from the detection system 204 associated with each rotation angle of the sample 214 to build up the scan. The image processor combines the projection images using a CT reconstruction algorithm to create 3D tomographic volume information for the sample as described hereinabove. The reconstruction algorithm may be analytical, where convolution or frequency domain filtering of the projection data is combined with back projection onto a reconstruction grid. Alternatively, it may be iterative, where techniques from numerical linear algebra or optimization theory are used to solve a discretized version of the projection process, which may include modeling of the physical properties of the imaging system.

From the projection images and/or the 3D tomographic volume information, the computer system 224 analyzes the sample. Phase fringe contrast effects, however, are a major issue in x-ray imaging, especially at high resolutions. They develop due to wave-front interactions caused by differing wave-speeds in differing constituent materials and material phases. These lead to characteristic bright fringes that impede further quantitative image segmentation and analysis and thus classification of particles within the sample. They also impede image denoising algorithms which are designed to work most effectively when applied to images exhibiting clear and distinguishable greyscale contrast.

The size of these fringes (measured at the detector) is usually extremely small ion the order of microns), so they typically do not play a significant role when imaging at low resolution, or when using large pixel size detectors (such as flat panel detectors). That said, the imaging architecture used by ZEISS X-ray microscopy and disclosed in U.S. Pat. No. 7,800,072 or PCT International Appl. No. PCT/US2019/059916, published as WO 2020/097111, is particularly susceptible to these artefacts, due to the extremely small pixel size at the scintillator, especially at higher (20×/40×) magnifications.

This effect is compounded when imaging at these length scales as it is typical to use small samples and image at low energies (to maximize contrast), and these low energies exhibit a stronger phase fringe contrast effect than the high energies more commonly used when imaging large samples at higher resolution. The magnitude of these effects may be, for low kV or high resolution images, many times the magnitude of any (real) absorption contrast.

Figure 2:
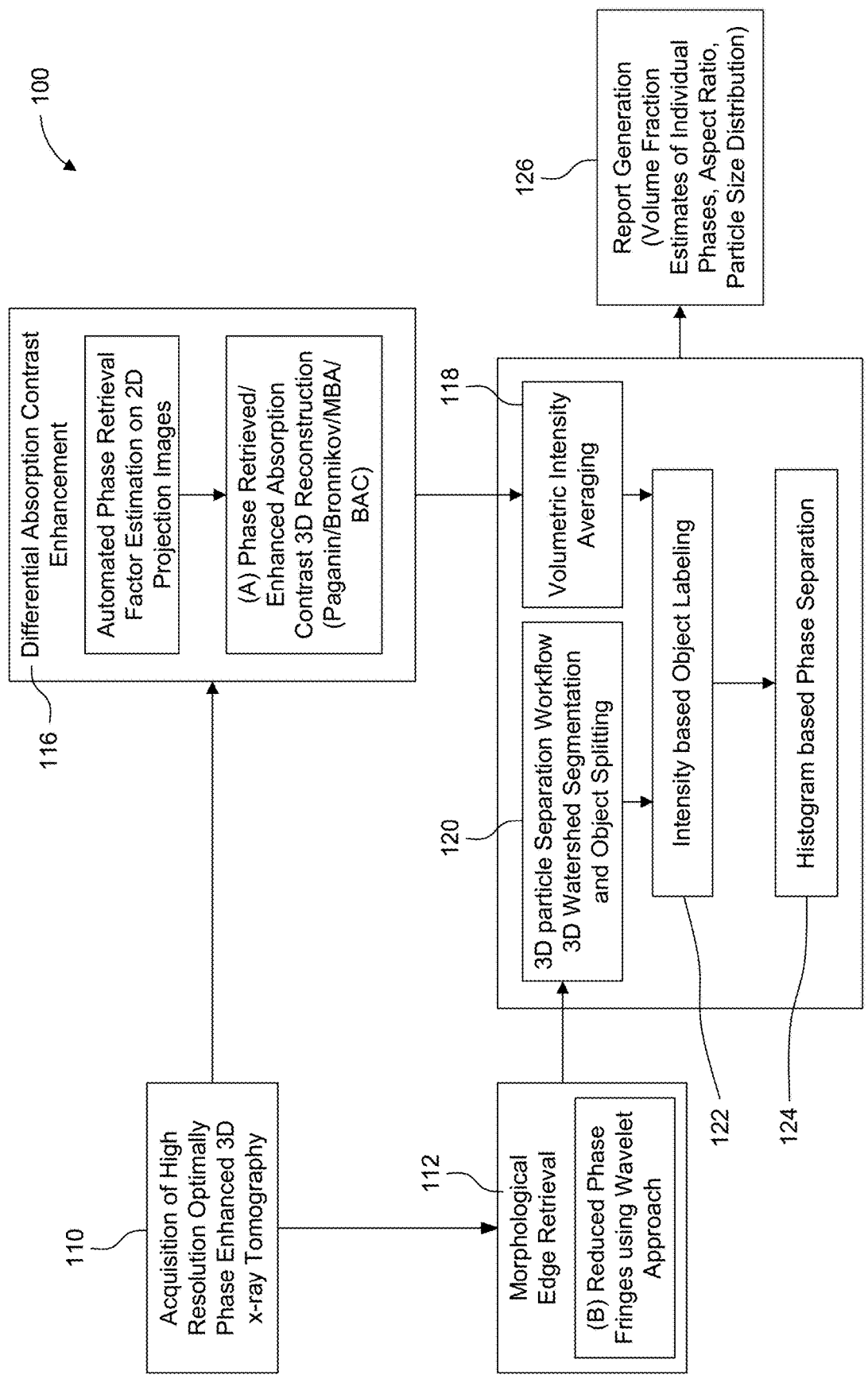
FIG. 2 is a flow diagram showing a first example of an image processing workflow for 3D reconstruction and processing for multi-phase classification and quantification.

FIG. 2 shows a first example of a workflow for 3D reconstruction and processing for multi-phase labeling and quantification 100 of the sample 214, according to the principles of the present invention. It leverages the fringe effects to classify particles by discriminating between particles and their material phases. For example, it could be used to distinguish between lactose particles and active pharmaceutical ingredient particles in a dry powder inhaler. The particles can then be further quantified by other metrics including volume fraction estimates of the individual material phases, aspect ratios of the particles, and the particle size distribution. The workflow is typically performed by the computer system 224 or another computer system based on the projections obtained by x-ray microscopy system 200

In more detail, there is an acquisition of a set of projections, which are reconstructed into a high resolution three dimensional (3D) x-ray tomography volume set by the microscopy system 200 in step 110. Optimally, this set of projections is enhanced by phase fringe contrast.

The set of projections are used two ways by the computer system 224, although it should be noted that both paths are not always needed.

First, in step 112, the morphological edge information is retrieved from the reconstructed volume data. Any phase fringes are preferably reduced along edges. Wavelet based filtering can be used as described below.

In parallel, differential absorption contrast enhancement is performed on the set of projections in step 116 by the computer system 224. Specifically, automated phase retrieval factor estimation is performed on the 2D projection images. The phase is retrieved and enhanced absorption contrast 3D reconstruction is performed on the set of projections. Preferably, the Bronnikov algorithm, Paganin algorithm, modified Bronnikov Algorithm (MBA) or Bronnikov-aided correction (BAC) are used. These methods/algorithms apply corrections to the mixed (absorption and phase fringe contrast) projections to remove the phase fringe signal. These corrected projection images can then be processed many times using a standard filtered backprojection algorithm to obtain reconstructions with lower or no phase fringe artifacts.

Volumetric intensity averaging is then performed by the computer system 224 on the absorption contrast 3D reconstruction in step 118.

In parallel, 3D particle separation workflow and 3D watershed segmentation and object splitting are performed in step 120 on the phase corrected volume set 114.

Both the phase-corrected 3D reconstruction 112 and the differential absorption contrast enhanced 3D reconstruction 116 are used in an intensity based object labeling process in step 122 that allows for the classification of the different particles in terms of material phase, i.e., different chemistries and/or different structures, e.g., amorphous or crystalline states or different crystalline structures. From this classification, further statistical measures since as particle size distributions, particle distribution and other metrics can be determined. Then histogram based phase separation is performed in step 124.

Finally, a report is generated in step 126 by the computer system 224 based on the classifications, including providing information such as labeled particles, the volume fraction estimates of the individual material phases, aspect ratios of the particles, and the particle size distribution.

It should be noted that when the 2D projection based phase fringe retrieval algorithms 116 are applied alone, there is an undesirable excessive smoothing of features (in Paganin and Bronnikov case) which leads to blurred edges which can be a considerable drawback when resolving small particles that are close to the resolution limits of the imaging system, or in the accurate particle size estimation.

Figure 3:
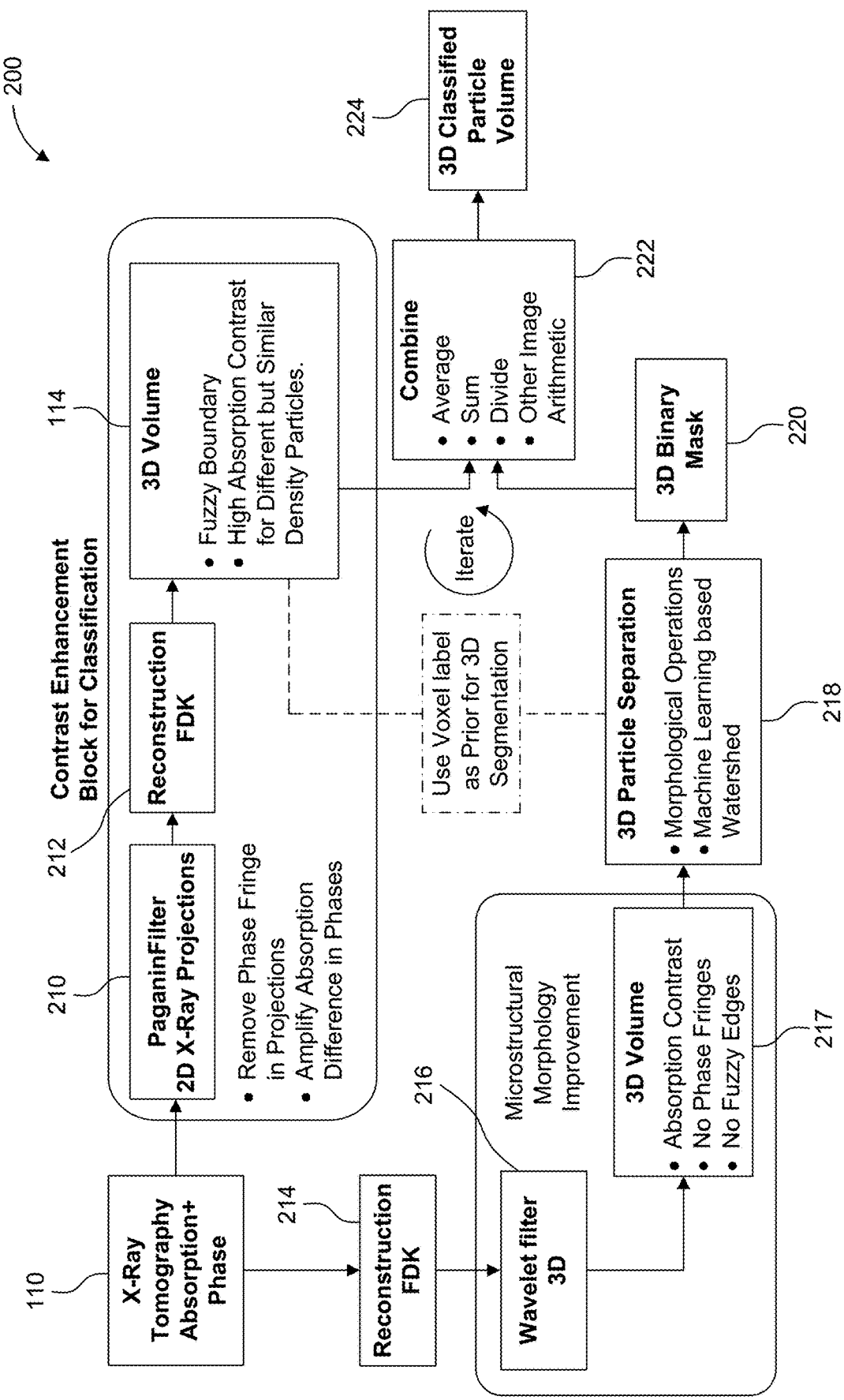
FIG. 3 shows another method for 3D reconstruction and processing for multi-phase classification and quantification.

FIG. 3 shows another method for 3D reconstruction and processing for multi-phase labeling and quantification 200 according to the principles of the present invention to classify particles by a computer system.

Again, there is an acquisition of a set of projections for use in reconstructing a high resolution three dimensional (3D) x-ray tomography volume set in step 110 by the microscopy system 200. Optimally, this set of projections is enhanced by phase fringe contrast.

The set of projections can be used in two ways by the computer system 224.

Optionally in parallel, a Paganin filter is applied to the set of projections in step 210. This removes or reduces phase fringes in the projections and/or amplifies the absorption differences in the material phases.

The FDK (Feldkamp, Davis and Kress) reconstruction algorithm is preferably used to reconstruct a phase corrected volume data set in step 212. This is a widely used filtered-backprojection (FBP) algorithm for 3D image reconstruction from circular cone-beam projections such as produced by laboratory x-ray sources.

Generally, the resulting phase corrected volume data 114 set will have somewhat fuzzy boundaries but high absorption contrasts for different but similar density particles.

First, a FDK reconstruction is also directly performed on the original set of projections in step 214. A wavelet filter is then applied to the enhanced absorption contrast 3D reconstruction in step 216 to yield an enhanced absorption contrast volume set 217. This yields a volume set with absorption contrast, no phase fringes, and no fuzzy edges. 3D particle separation is then performed on the enhanced absorption contrast volume set.

3D particle separation can then be performed in the enhanced absorption contrast volume set in step 218. This process is facilitated by reference to the phase corrected volume data set 114 that can be used for voxel labeling. This produces a 3D binary mask 220.

A 3D binary mask 220 is then applied in step 222 on the phase corrected volume data set 114 in a combination operation to improve the images and yield a 3D classified particle volume in step 224.

Figure 4:
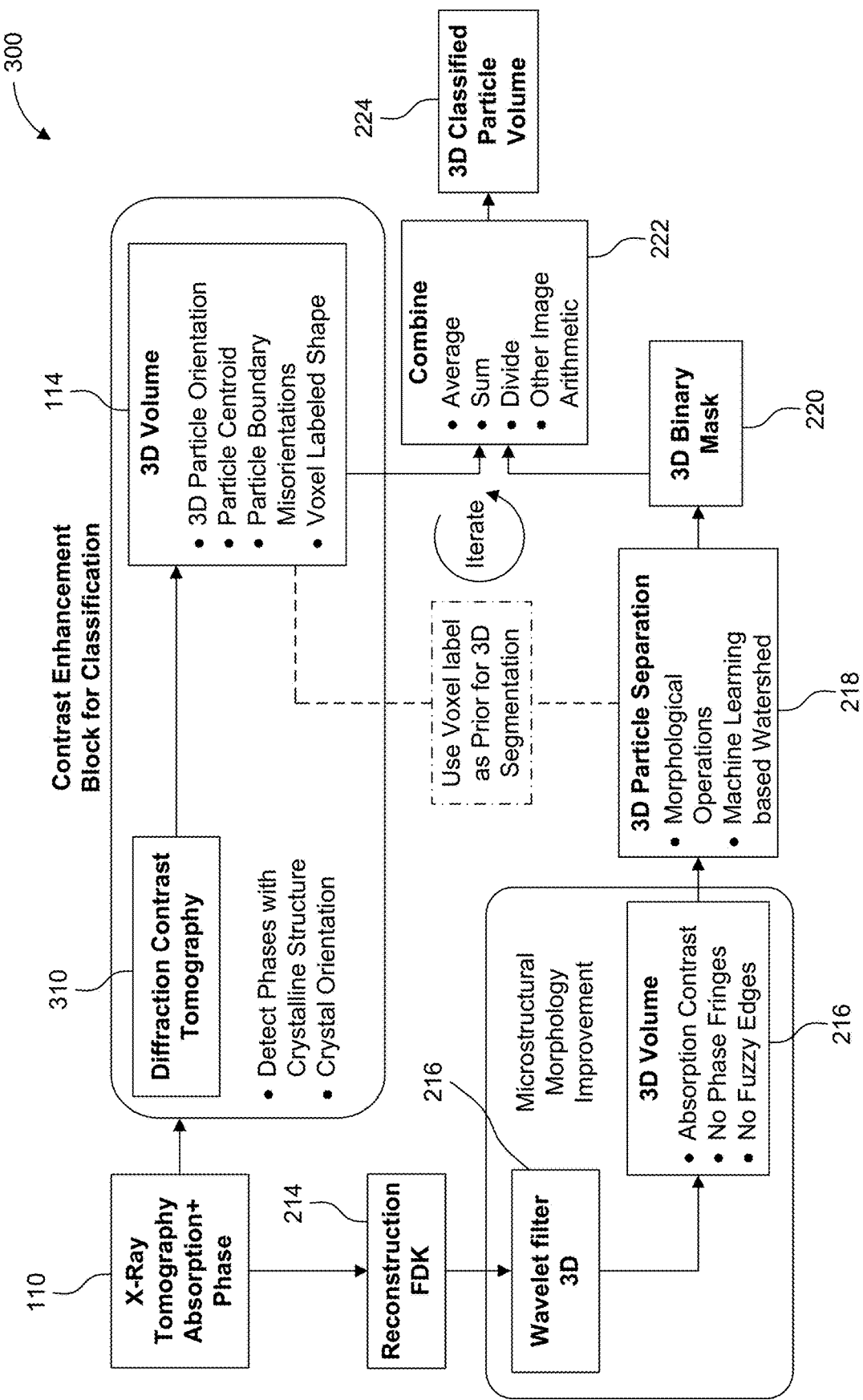
FIG. 4 shows another method for 3D reconstruction and processing for multi-phase classification and quantification using diffraction contrast tomography to resolve crystalline material phases.

FIG. 4 shows another method 300 for 3D reconstruction and processing for multi-phase labeling and quantification using diffraction contrast tomography to resolve crystalline between material phases and thus classify different particles to be performed by a computer system.

This is similar to the previous example but diffraction contrast tomography is used in step 310 to detect material phases with crystalline structure and the orientation of those structures.

Figure 5:
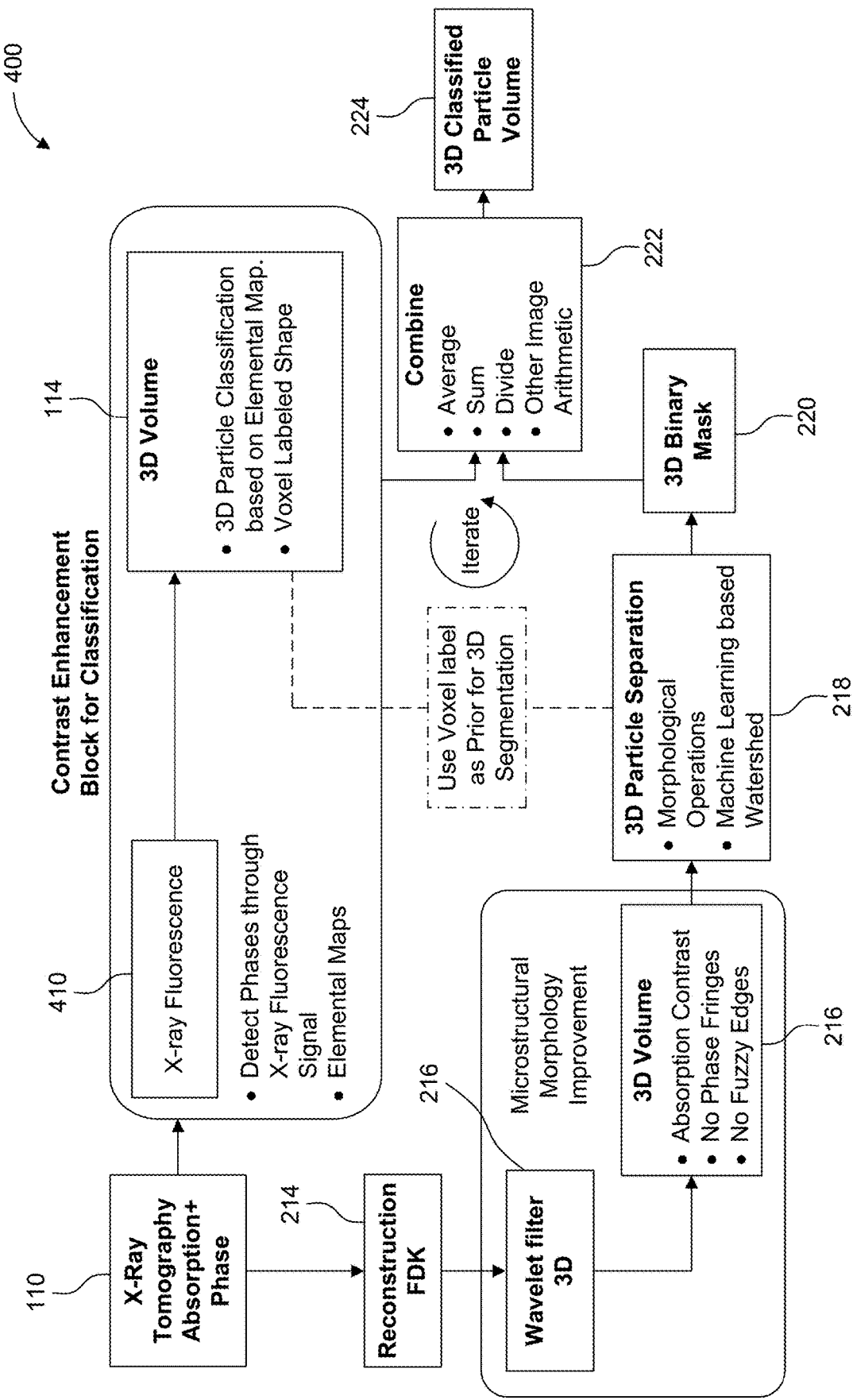
FIG. 5 shows another method for 3D reconstruction and processing for multi-phase classification and quantification using x-ray fluorescence to detect elements and thus elemental maps.

FIG. 5 shows still another method for 3D reconstruction and processing for multi-phase labeling and quantification by a computer system.

This is similar to the previous examples but x-ray fluorescence 410 is used to detect different elements to create elemental maps.

Figure 6A:
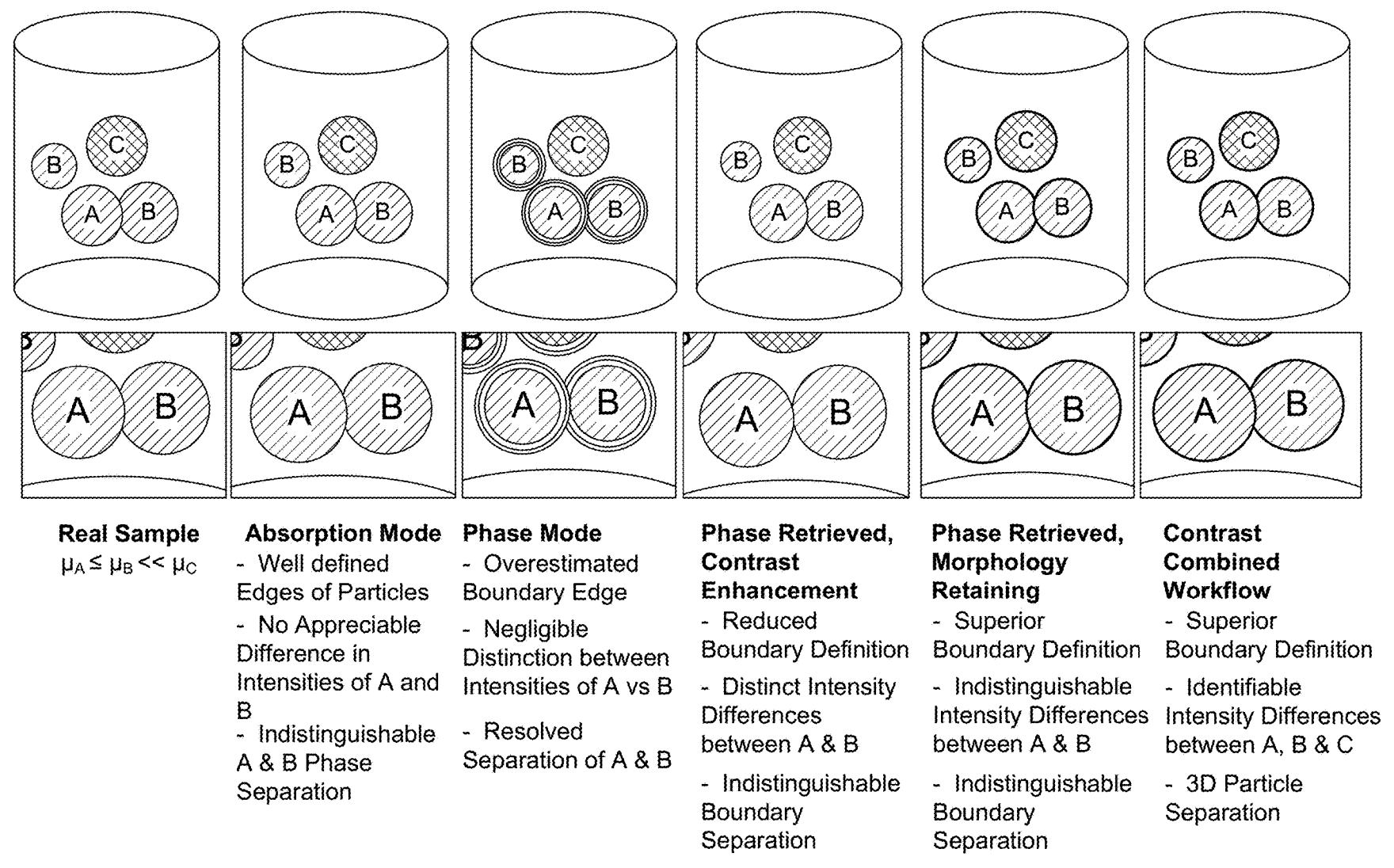
Figure 6B:
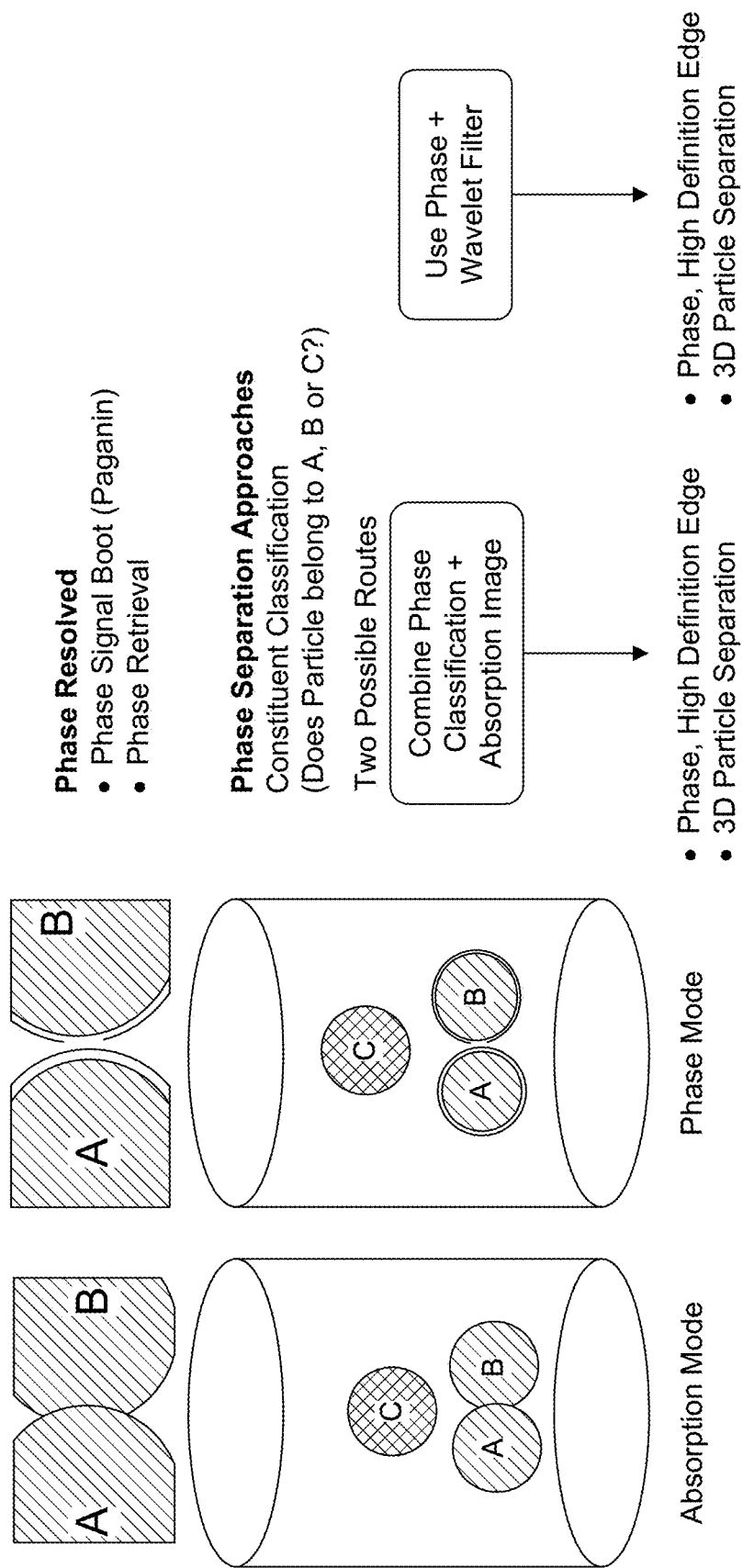

FIGS. 6A and 6B are schematic diagrams showing absorption and phase enhanced images used to improve particle analysis.

Figure 7A:
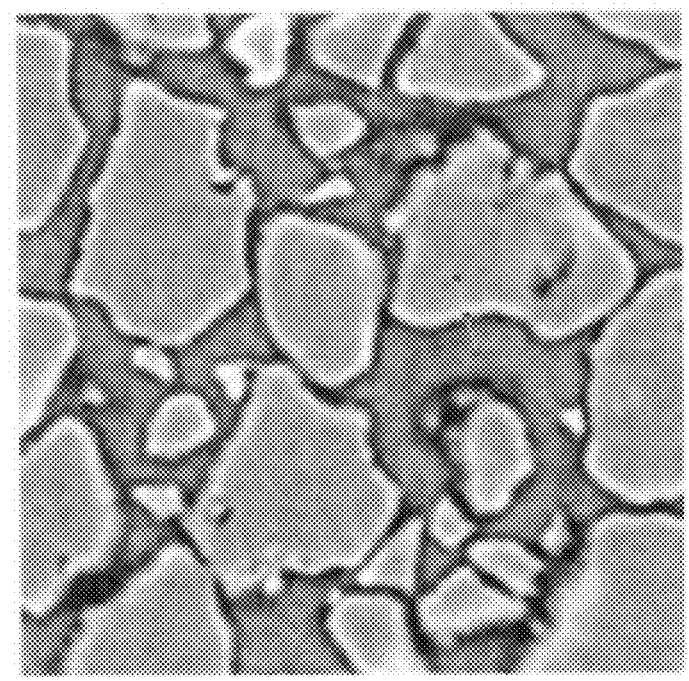
FIG. 7A is an image and 7B is a plot of gray value as a function of distance showing the characteristic bright fringe on x-ray microscope image, with distinct bright and dark regions defining phase interfaces across image edges.
Figure 7B:
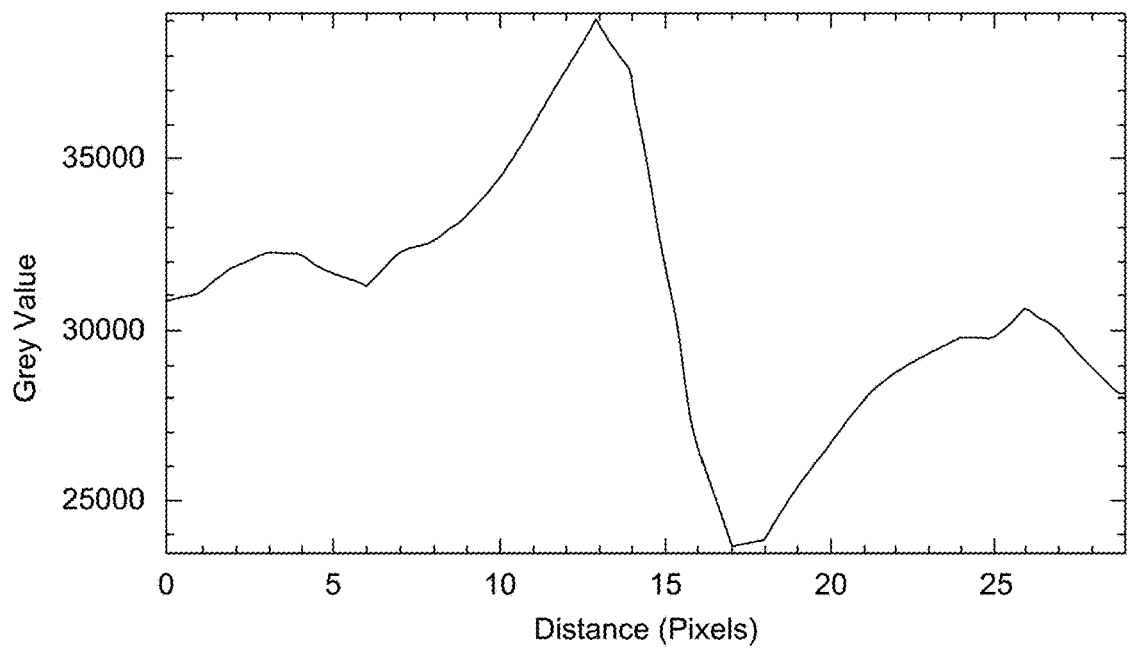

Wavelet Filtering:

FIG. 7A is an image and 7B is a plot of gray value as a function of distance showing the characteristic bright fringe on x-ray microscope image, with distinct bright and dark regions defining material phase interfaces across image edges.

Figure 8:
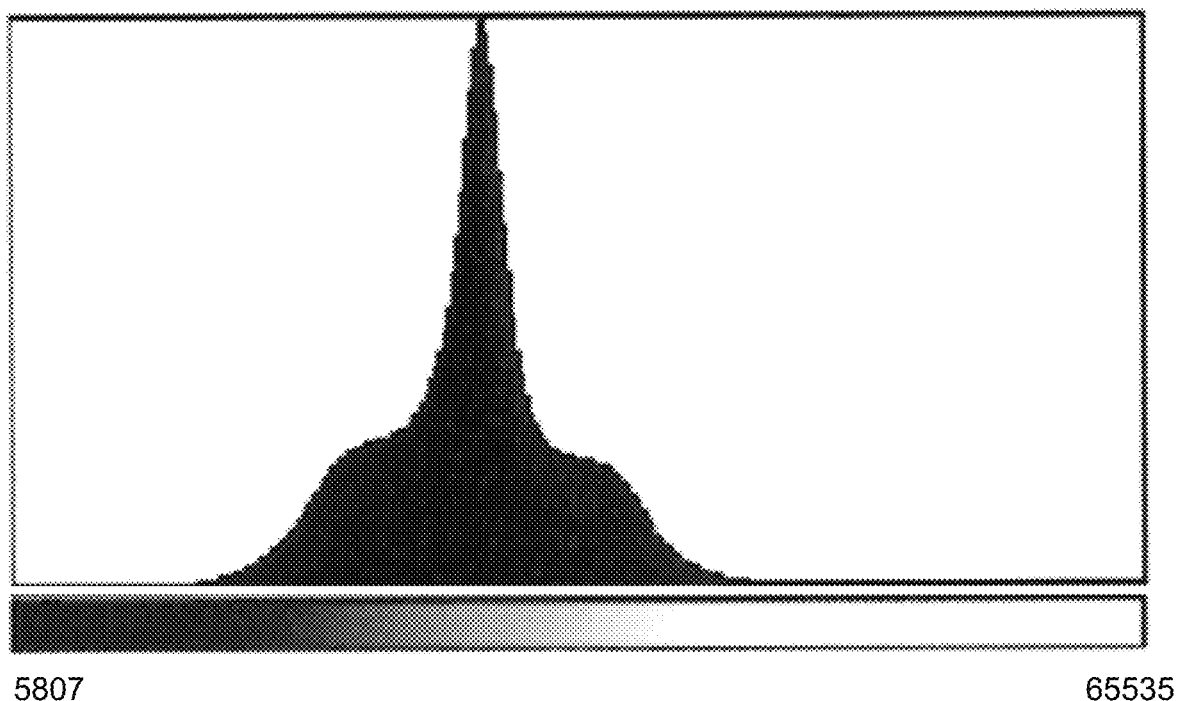
FIG. 8 is a greyscale histogram of an image exhibiting significant greyscale contrast.

FIG. 8 is a greyscale histogram of an image exhibiting significant greyscale contrast. This distribution shows no clear threshold, which would allow for image segmentation and subsequent quantitative analysis between different material phases.

It should be noted that these effects in an image are sometimes viewed as desirable, as they allow for easy determination of edge profiles by a manual observer, however they provide extremely challenging images for quantitative segmentation and analysis, and as such are usually viewed as not desirable for these other applications.

As these phase fringe contrast effects display theoretically very predictable properties (in the frequency domain) several approaches have been suggested to remove phase fringe effects from images, either in the projection or reconstructed domain (e.g. Paganin phase fringe removal as described in Paganin, et al., "Simultaneous phase and amplitude extraction from a single defocused image of a homogeneous object," published Journal of Microscopy, Vol. 206, Issue 1, pages 33-40 (2002), (https://onlinelibrary.wiley.com/doi/abs/10.1046/j.1365-2818.2002.01010.x)). Such algorithms are typically developed for the synchrotron community, however, and are either developed for monochromatic x-ray beams, or use a concept of an "effective wavelength" when dealing with polychromatic x-rays. They also require extensive knowledge of the acquisition parameters (particularly sample-detector distance and pixel size) to perform effective phase fringe removal. These parameters are typically extremely challenging to determine for real samples under real conditions.

The disclosed workflows allow for the effective determination of these parameters for a lab-based (polychromatic) x-ray source. Specifically the workflow involves the determination of the properties "A" and "W" from the description of phase fringes as edge-convolved wavelets, as Understanding phase contrast artefacts in micro computed absorption tomography described by Wernersson, Erik L G et al, "Understanding Phase Contrast Artefacts in Micro Computed Absorption Tomography." SSBA Symposium, Proceedings. Swedish Society for Automated Image Analysis (SSBA), 2014 (https://biblio.ugent.be/publication/5721759)).

Figure 9:
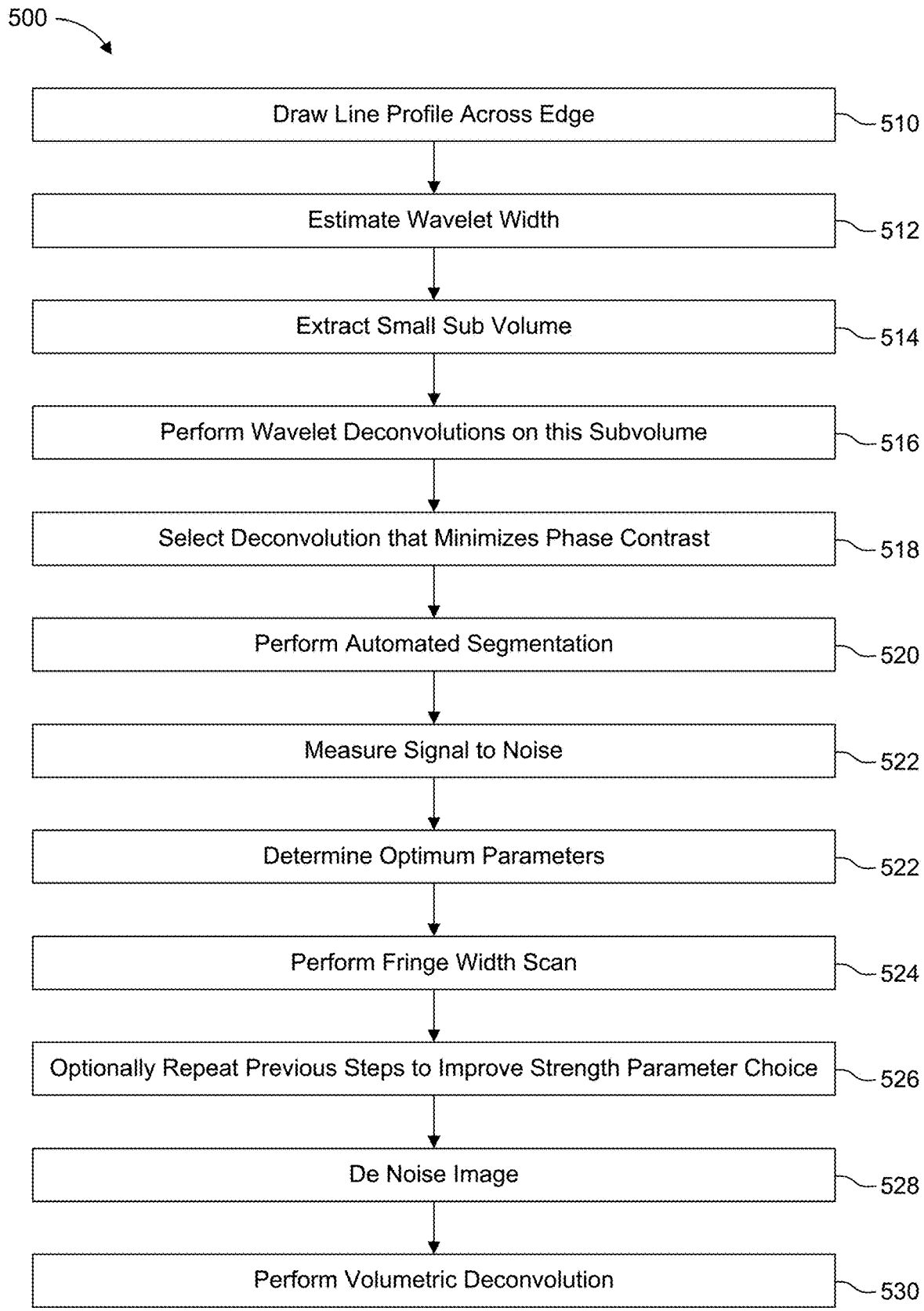
FIG. 9 shows a method for determination of the parameters required for phase contrast removal via wavelet deconvolution.

FIG. 9 shows a workflow 500 that makes it possible for the computer system to accurately and robustly determine the parameters required for phase contrast removal via wavelet deconvolution.

It comprises several steps.

Figure 10A:
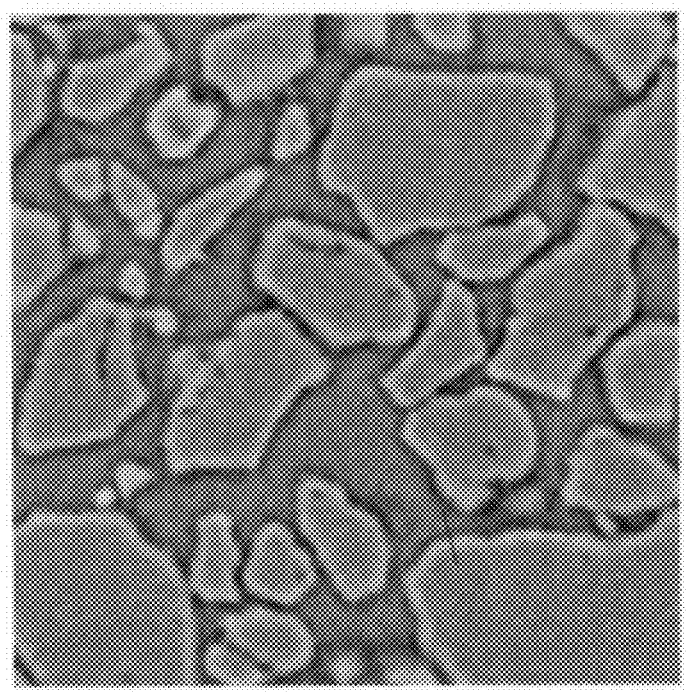
FIG. 10A is an image and 10B is a plot of gray value as a function of distance showing the characteristic bright fringe on x-ray microscope image, with distinct bright and dark regions defining material phase interfaces across image edges and fringe width measurement.
Figure 10B:
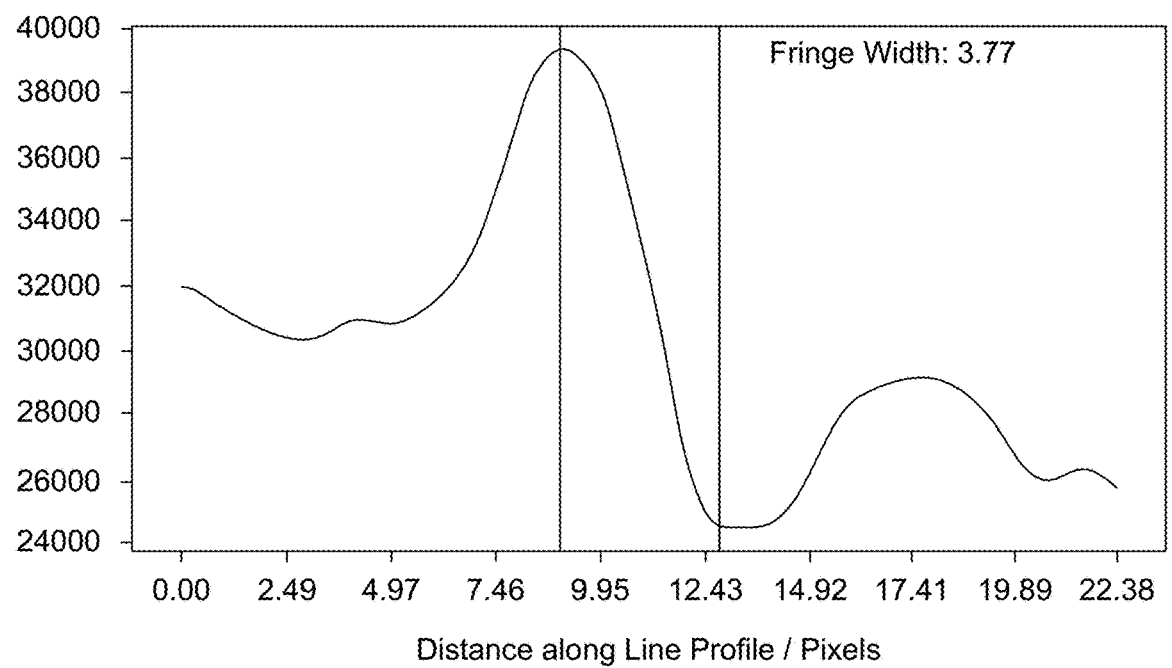
Figure 11A:
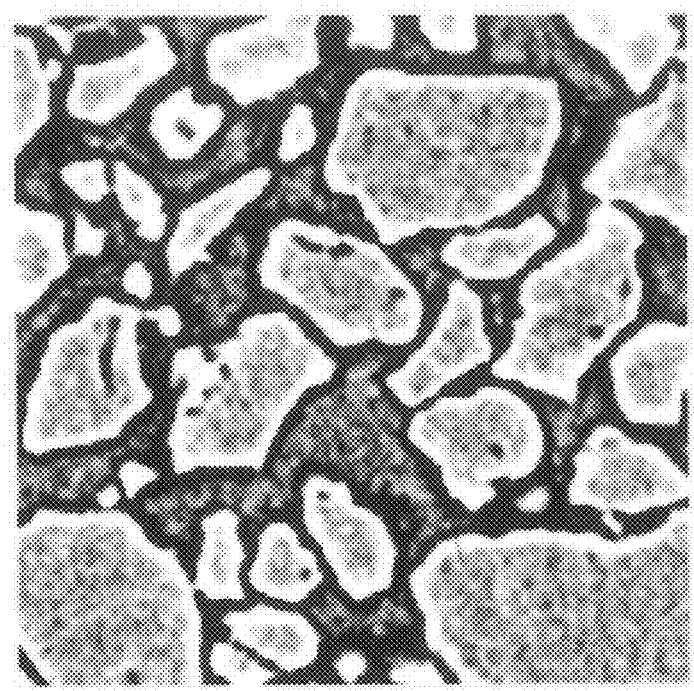
FIG. 11A is an image and 11B is a plot of gray value as a function of distance showing the accentuated fringes on x-ray microscope image and fringe width measurement.
Figure 11B:
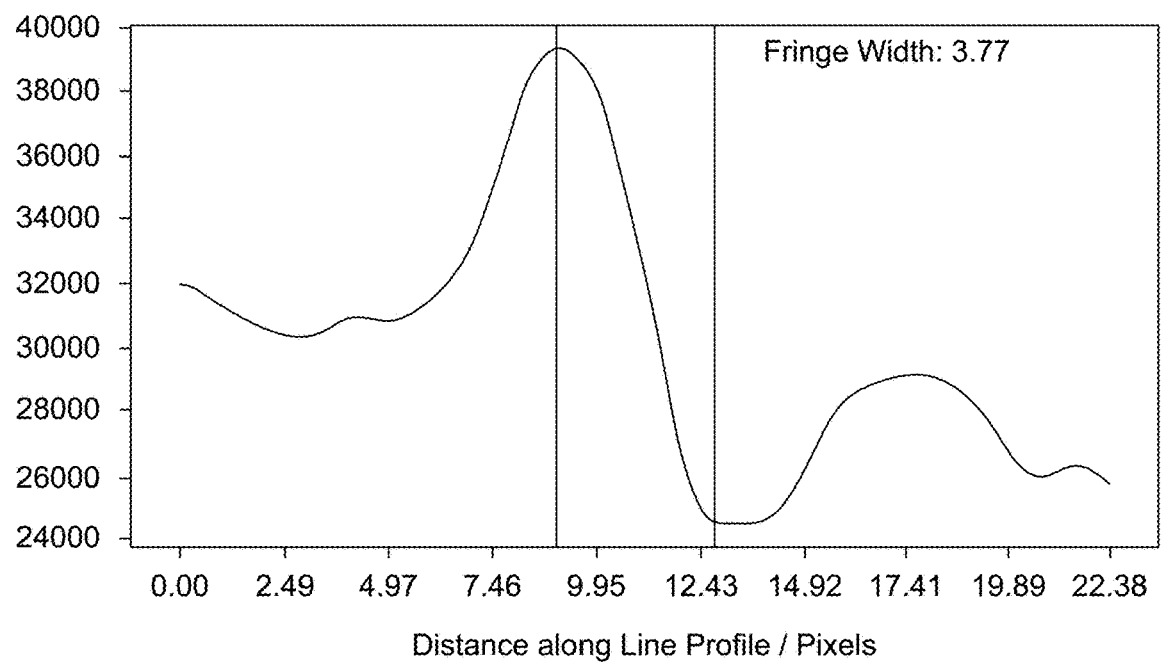
Figure 12A:
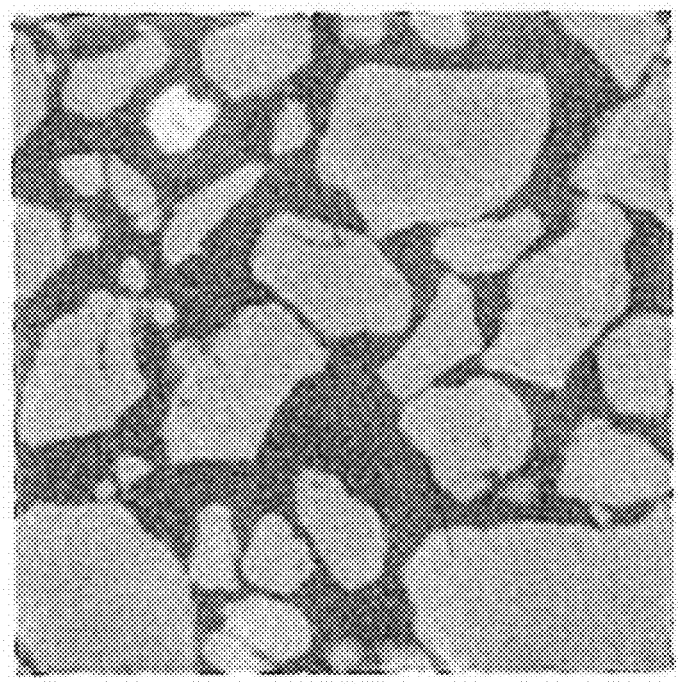
FIG. 12A is an image and 12B is a plot of gray value as a function of distance showing the reduced fringes on x-ray microscope image and fringe width measurement.
Figure 12B:
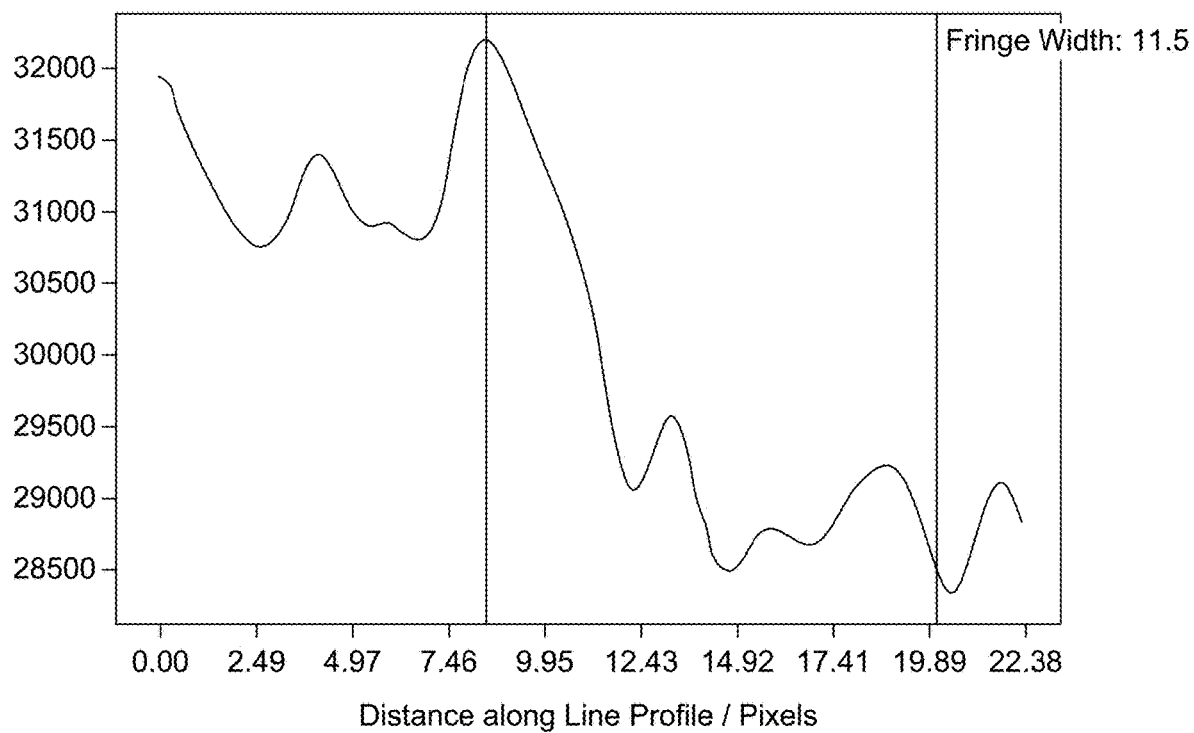

First a line profile is drawn across a specific edge in step 510, and then wavelet width is estimated in step 512 by measuring the distance (along the line profile) between the maximum and minimum portion of the line profile. This is shown in FIGS. 10A and 10B.

A small subvolume (for computational speed) is then extracted from the large image in step 514.

A series of wavelet deconvolutions are then performed on this subvolume at a variety of strengths, ranging from 0 to 50, in step 516.

This sequence can be visualized as a "scan series" through the range of parameters by selecting one where the phase contrast is minimized in step 518. Several examples of different strengths are shown below in FIGS. 11A and 11B and 12A and 12B.

A too high value of phase fringe strength, while having the effect of removing the phase artefacts, will tend to increase noise in the image. As such, a method for automated optimum deconvolution strength selection is preferred.

In more detail, at each point in this scan series, an automated (universal threshold based) segmentation is performed in step 520. Any of a number of auto-thresholding techniques can be used. Otsu's method has been tested.

Signal to noise ratio is measured in step 522 using this segmentation at each point in the scan series. This is defined as:

$$SNR = \frac{|\mu_1 - \mu_2|}{(\sigma_1 + \sigma_2)/2}$$

Where $\mu_1$ and $\mu_2$ are the average greyscale value, and $\sigma_1$ and $\sigma_2$ are the standard deviations of greyscale values, for material phases 1 and 2, respectively (as defined in the automated segmentation step).

At too-low correction values, the phase fringes add to the standard deviation of each phase, decreasing SNR. At too-high correction values, the random noise content of the image is increased, decreasing SNR. There exists, therefore, a correction strength value which maximizes SNR (as defined above), corresponding to the optimum parameter choice which is determined in step 524.

Figure 13A:
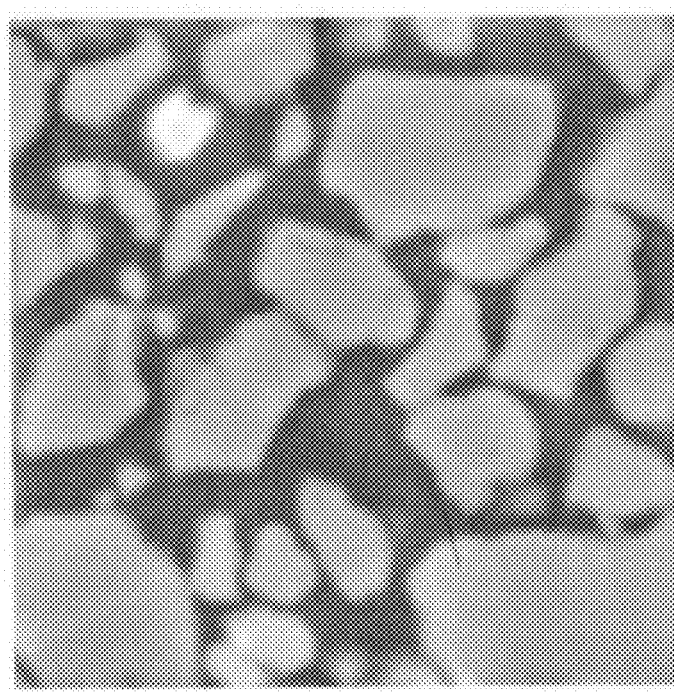
FIG. 13A is an image and 13B is a plot of gray value as a function of distance showing the blurred edges on x-ray microscope image and fringe width measurement.
Figure 13B:
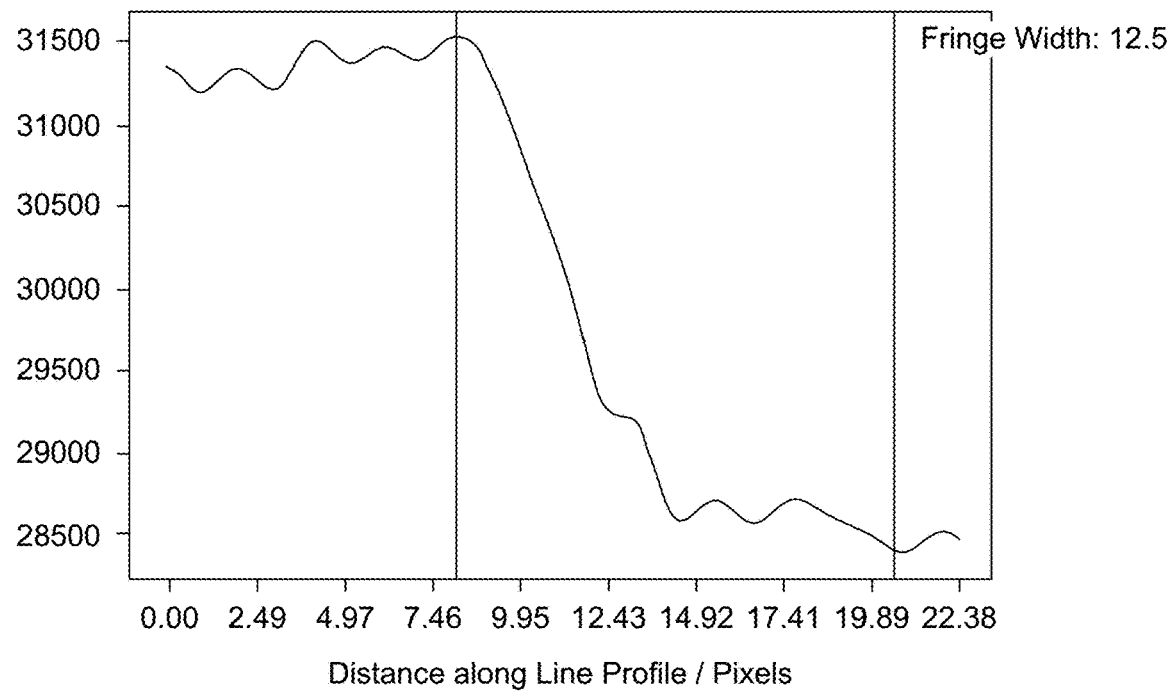
Figure 14A:
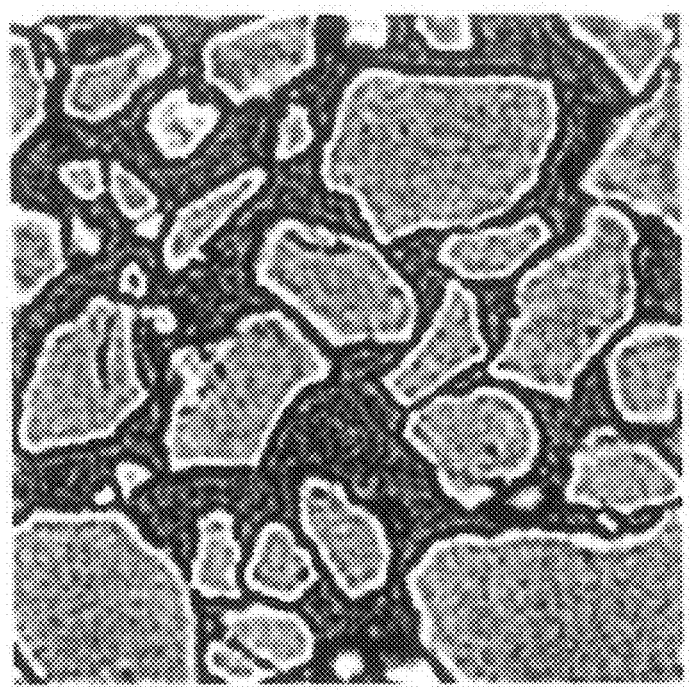
FIG. 14A is an image and 14B is a plot of gray value as a function of distance showing the incorrect fringe width measurement.
Figure 14B:
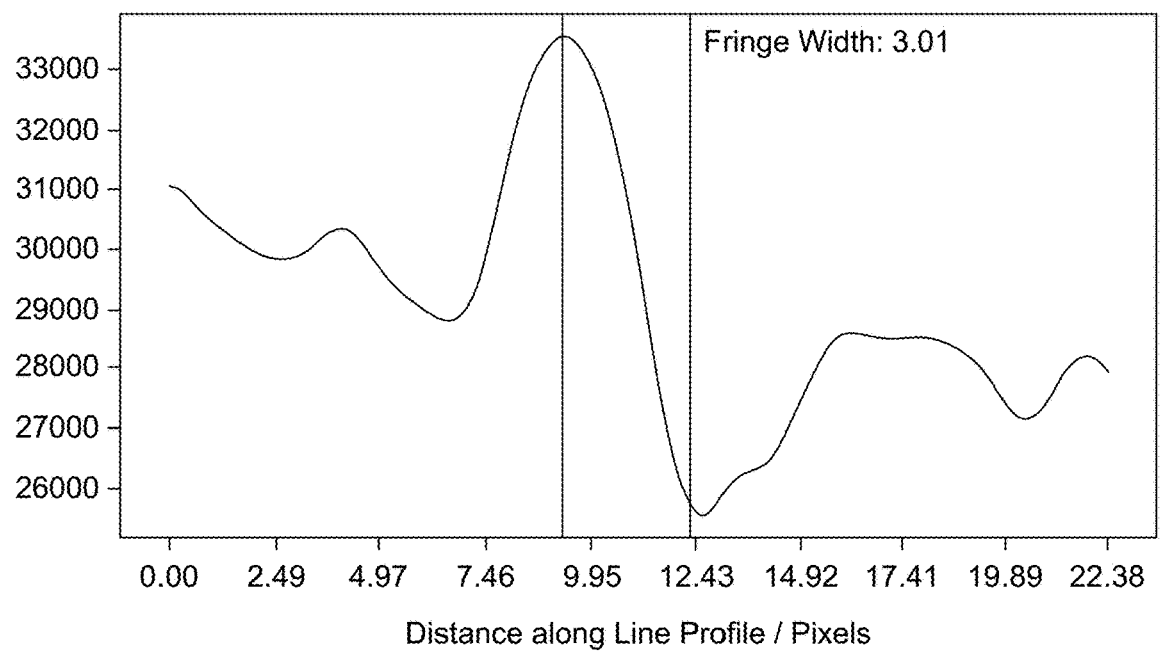
Figure 15A:
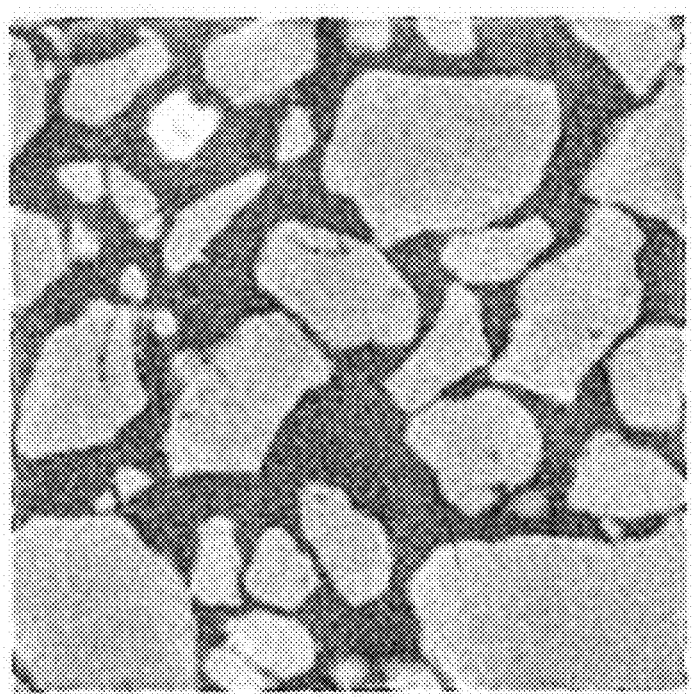
FIG. 15A is an image and 15B is a plot of gray value as a function of distance showing the correct fringe width measurement.
Figure 15B:
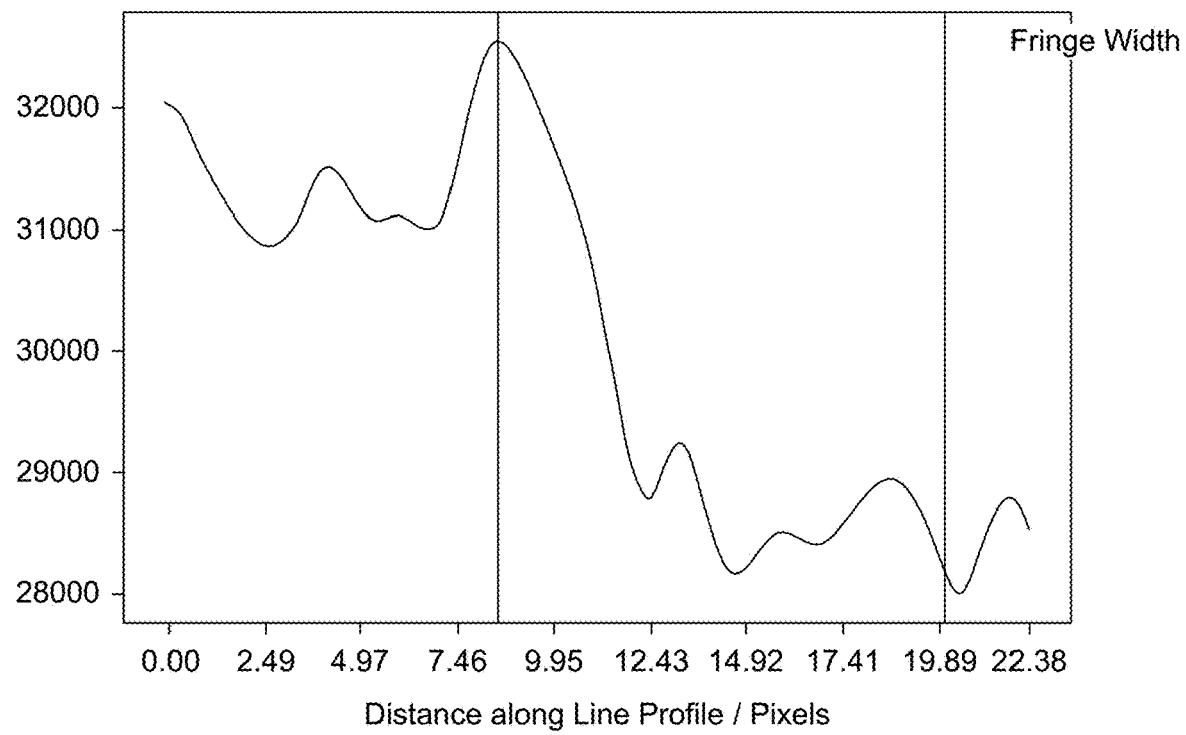

A fringe width scan is then performed (from fringe widths of 0 to 10 pixels), allowing the user to select the exact width value optimal for the image in step 524. An example of incorrect and correct parameter choice is shown in FIGS. 13A/13B where the wavelet width is too small and too much high frequency domain information is removed from the images, which blurs the data. The example of FIGS. 14A and 14B shows the case where the wavelet width is too large and fringes are missed, with wavelet peaks occurring past the phase contrast peaks. The example of FIGS. 15A and 15B show a correct wavelet width since the image is not blurred but the phase fringes are removed.

The previous step can then be repeated to determine the correct strength parameter choice in step 526.

In any case, once the strength parameter has been chosen, denoising may then be performed on the image in step 528. This is likely to be more effective than when performed on the original image containing phase artefacts, as edge-preserving noise suppression filters commonly assume the image exhibits significant absorption type contrast.

Also presented is an algorithm whereby the noise threshold parameter for the Nonlocal means denoising filter is determined as part of the de noise step 528. See Buades, et al., Non-Local Means Denoising, Image Processing On Line (IPOL), Sep. 13, 2011, http://www.ipol.im/pub/art/2011/bcm_nlm/article.pdf.

a. Perform an automated segmentation on the (phase corrected) image. Any of a number of auto-thresholding techniques can be used. Otsu's method has been tested.

b. Determine the average noise level:

$$\sigma_{av} = (\sigma_1 + \sigma_2)/2$$

Where $\sigma_{av}$ is the inter-label averaged standard deviation and $\sigma_1$ and $\sigma_2$ are the standard deviation of the greyscale in each of the label regions defined using the automated segmentation step.

c. An appropriate noise threshold for the non-local means an algorithm can be assigned as a simple multiple of that value. A value of $1.2 \times \sigma_{av}$ was determined as empirically appropriate in most cases.

Finally, referring back to FIG. 9, a final volumetric deconvolution (and subsequent denoising) is performed using the parameters determined by the scan series in step 530.

Generally, it is important to determine parameters for the removal of phase contrast artefacts via wavelet deconvolution and initially estimate wavelet width via automated measurement on a line profile. It is also important to use multiple scan series, scanning over both wavelet amplitude and width for optimal parameter choice.

On the other hand, it is not always critical to employ sub-volumes, for computational efficiency. Further, the automated strength selection via SNR maximization is optional, along with image denoising via non-local means.

Empirically, the wavelet width must be determined at +/−0.5 pixels, and the wavelet amplitude must be correct to within a factor of 2, although the impact is not the same for under vs over estimation of amplitude. If wavelet amplitude is under-estimated phase fringes are not effectively removed. If wavelet amplitude is over-estimated the phase artifacts are removed, but noise is also exacerbated.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for material analysis, wherein the material comprises particles with two or more phases where the phases have chemistries with insignificant density differences, and amorphous or crystalline states, the method comprising:
   obtaining a set of x-ray projections containing absorption and phase information for reconstruction of a tomography of a sample;
   obtaining a first reconstructed volume dataset;
   obtaining morphological edge information from the first reconstructed volume dataset using wavelet based filtering to remove particle edge phase effects from the reconstructed volume dataset; and
   classifying particles within the sample;
   wherein before classifying the particles, the method further comprises one of:
      performing differential absorption contrast enhancement on the set of projections, obtaining a second reconstructed volume dataset, and combining the first reconstructed volume dataset with the second reconstructed volume dataset to classify the particles;
      performing diffraction contrast tomography, obtaining a second reconstructed volume dataset, and combining the first reconstructed volume dataset with the second reconstructed volume dataset to classify the particles; or
      performing x-ray fluorescence to detect different elements to create elemental maps, and combining the maps with the first reconstructed volume dataset to classify the particles.

2. The method of claim 1, wherein combining the volume datasets comprises performing voxel labeling on one of the volume data sets to create a 3D binary mask that is applied to the other volume dataset.

3. The method of claim 1, wherein the wavelet based filtering is used to remove edge phase effects from the reconstructed volume dataset.

4. The method of claim 1, wherein the wavelet based filtering includes estimating wavelet width via automated measurement on a subvolume.

5. The method of claim 1, further comprising performing a series of wavelet deconvolutions at a variety of strengths.

6. The method of claim 5, further comprising selecting a strength that maximizes signal to noise ratio.

7. The method of claim 1, further comprising generating a report providing information including volume fraction estimates of the individual phases, aspect ratios of the particles, and/or the particle size distribution within the sample.

8. The method of claim 1, wherein the sample is a pharmaceutical, such as an inhaler.

9. An x-ray microscopy system, comprising:
   an x-ray imaging system for obtaining the projections; and
   a computer system configured to perform the method according to claim 1.

* * * * *